May 19, 1931. H. U. DURANT 1,805,814

FLUID PRESSURE CONTROL

Filed March 5, 1929

INVENTOR.
Herbert U. Durant,

BY R. W. Smith

ATTORNEY.

Patented May 19, 1931

1,805,814

UNITED STATES PATENT OFFICE

HERBERT U. DURANT, OF LOS ANGELES, CALIFORNIA

FLUID PRESSURE CONTROL

Application filed March 5, 1929. Serial No. 344,191.

This invention is a valve for regulating pressure, and has for its object to provide a predetermined pressure in accordance with movement of a suitable control, and maintain the predetermined pressure as long as the position of the control remains unchanged. While the embodiment of the invention herein illustrated and described is particularly adapted for use in connection with a fluid pressure operating means for vehicle brakes as set forth in my copending application, Ser. No. 344,190, filed March 5, 1929, it will be apparent from the following description that the invention is of general application for regulating and automatically maintaining a predetermined pressure for any type of fluid pressure operated mechanism.

It is a further object of the invention to not only regulate and uniformly maintain a pressure in accordance with the positioning of a suitable control, but also gradually and uniformly increase or decrease the pressure in accordance with corresponding movement of the control, thereby particularly adapting the invention for use in connection with fluid pressure power appliances such as the vehicle brake operating mechanism described in my above mentioned copending application, where it is desirable that continued movement of the control device in either of opposite directions will produce a gradually increasing or decreasing fluid pressure, and will uniformly maintain the same without further manipulation when movement of the control is stopped at any predetermined point.

It is a still further object of the invention to provide for adjustment of the control valve so that when it has been shifted to its limit of movement it will permit the flow of only a predetermined maximum pressure irrespective of the actuating force which may be exerted against the control. In its application to fluid pressure brakes the invention will thus permit of the control valve being so adjusted that in no event will the pressure developed be sufficient to lock the brakes and cause the vehicle to skid.

It is a still further object of the invention to adapt the control for manipulation with little effort, as is particularly desirable when used in connection with vehicle brakes where road fatigue incident to repeated brake applications is often excessive; but the apparatus provides some resistance to free movement of the control, with the resistance varying in accordance with the pressure application resulting from its manipulation, in order that the operator may be relatively advised as to the power application by the resistance felt in actuating the control. In its use in connection with vehicle brake mechanism the invention thus provides for applying the brakes with the driver sensing the braking effect by the resistance encountered in depressing a pedal, as in the usual practice, but the driver is relieved of all excessive physical exertion through substitution of fluid pressure operation for the usual manual actuation.

The invention preferably also provides for adjusting the initial resistance encountered in actuating the control, so as to adapt the device to the individual user's sense of feeling, as is particularly desirable in sensing the application of vehicle brakes; and the control may also be arranged for adjustment of its actuating means so that when the invention is employed in connection with vehicle brakes, the actuating means which will preferably be in the form of an ordinary brake pedal may be made readily accessible to the driver's foot, preferably alongside the usual brake pedal and closely adjacent the accelerator.

Further objects of the invention will be readily understood from the following description of the accompanying drawings, in which.

Figure 1:
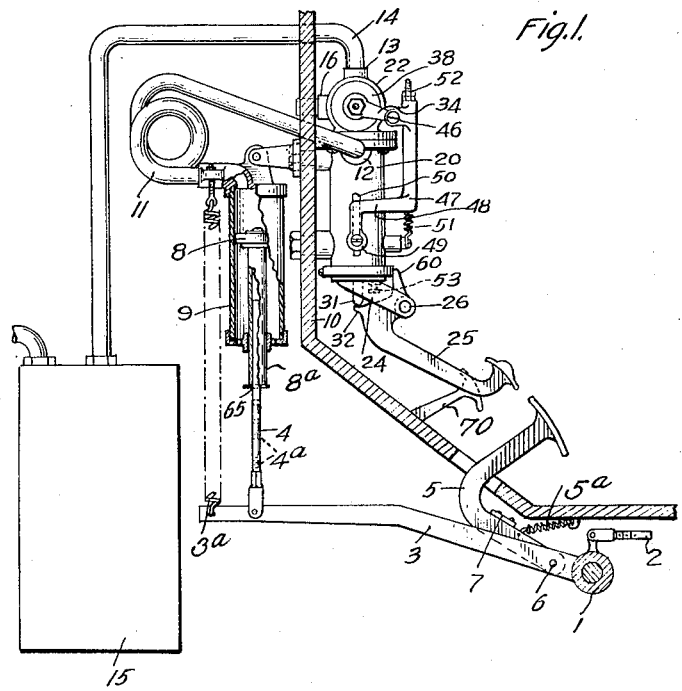
Fig. 1 is a side elevation showing the invention employed in connection with fluid pressure operated vehicle brakes.

In the drawings I have shown part of a usual vehicle brake operating mechanism including a rock shaft 1 provided with brake rods 2 for operating the usual vehicle brakes (not shown), the lever 3 for rocking the shaft being in the present instance adapted for actuation by either a rod 4 or by the usual foot pedal 5. Brake pedal 5 instead of being integral with lever 3 as in the usual construction, is preferably pivoted to the lever close to its fulcrum 1 as shown at 6, with a spring 5$^a$ tending to retract the pedal as shown in Fig. 1 so that the brakes may be actuated by axial movement of rod 4 without appreciably moving the usual brake pedal, or the brake pedal may be depressed and engage lever 3 by means of a bracket 7 so as to actuate the brakes in usual manner.

Rod 4 is adapted for axial depression responsive to fluid pressure for applying the brakes, and as an instance of this arrangement is shown telescoping in the piston rod 8$^a$ of a piston 8 which reciprocates in a cylinder 9 which may be mounted on the back of the dash 10 of the vehicle.

The end of piston rod 8$^a$ is adapted to abut against a pin 65 projecting from rod 4 and preferably adjustable axially of said rod, as for example by spacing transverse bores 4$^a$ along the lengths of the rod with the pin 65 adapted for selective reception in said bores. A spring 3$^a$ tends to retract lever 3 and normally yieldably telescopes rod 4 relative to piston rod 8$^a$ so that pin 65 abuts against the end of the piston rod for elevating piston 8 in its cylinder 9 as shown in Fig. 1. The lever 3 may thus be actuated by depression of piston 8 in its cylinder or may be manually actuated by pedal 5 without disturbing the piston, due to the telescopic engagement 4—8$^a$.

Fluid pressure is supplied to cylinder 9 through a conduit 11 connected to the discharge 12 of the control valve forming the subject matter of the present invention, and this control valve has an intake 13 connected by conduit 14 to a source of fluid pressure supply shown as a compressed air tank 15. The control valve is also provided with an exhaust 16 leading to the atmosphere, and the valve is so arranged as to close exhaust 16 and open intake 13 to discharge 12 for supplying fluid pressure to cylinder 9 for axially moving rod 4 and thereby applying the brakes, or may be shifted so as to close intake 13 and open discharge 12 to the exhaust 16 for relieving the pressure in cylinder 9 so that spring 3$^a$ may release the brakes.

Figure 2:
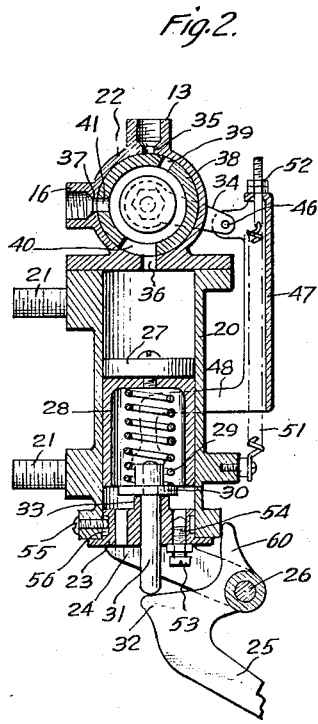
Fig. 2 is an axial section through the control valve.
Figure 3:
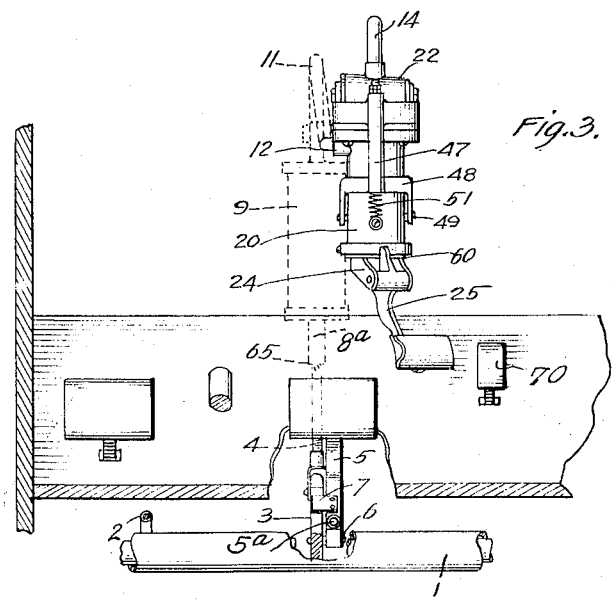
Fig. 3 is a front elevation of the assembly shown in Fig. 1.

The control valve preferably comprises a cylinder 20 adapted for mounting on the front of dash 10 by means of bolts 21, and closed at its upper end by a cap forming a valve casing 22 for a usual three-way valve. The lower end of the cylinder may receive a rotatably adjustable ported plug 23 having a depending and radially projecting bracket 24 to which a foot pedal 25 is pivoted as shown at 26. A piston 27 having a depending skirt 28 is slidable in cylinder 20, and a coil spring 29 engages the underside of the piston with its lower end supported on a collar 30 carried by a plunger 31 which projects through plug 23. The plunger is adapted for abutment by lever arm 32 of the foot pedal, so that with the foot pedal in normal position as shown in Fig. 2 the plunger may be depressed with its collar 30 resting upon a guide sleeve 33 of plug 23, and depression of the foot pedal will shift the plunger upwardly in the cylinder 20 as hereinafter described.

The valve casing 22 preferably has diametrically opposite intake and discharge ports 35 and 36 and an exhaust port 37 at right angles thereto, with the intake and exhaust ports 35 and 37 communicating with nipples on casing 22 forming the intake 13 and exhaust 16 respectively. The discharge port 36 opens into cylinder 20 which is provided adjacent its upper end with a nipple forming the discharge 12. The three-way valve in casing 22 may be a usual tapered cylinder 38 closed at its ends and rotatable in the valve casing, and is provided with circumferentially spaced peripheral ports 39—40—41 forming an intake, discharge and exhaust respectively. These ports are so positioned that alinement of port 41 with exhaust 37 will close port 39 to intake 35 and open port 40 to discharge 36 as shown in Fig. 2, and partial rotation of the valve will first close port 41 to exhaust 37 and will then open port 39 to intake 35 while maintaining port 40 in open communication with discharge 36. With the parts in the position shown in Fig. 2 the pressure supply from tank 15 is thus cut-off from cylinders 9 and 20, and these cylinders discharge to the atmosphere through exhaust 16 so that no operating pressure is applied through rod 4 to the brake lever 3. By turning the valve 38, the exhaust 16 is first closed and intake 13 is then opened for supplying pressure to cylinders 9 and 20. The pressure in cylinder 9 will axially move rod 4 for operating the vehicle brakes through swinging movement of lever 3, and the corresponding pressure in cylinder 20 against piston 27 will tend to depress the piston against the yielding resistance of spring 29 in order to regulate the pressure by controlling valve 38 as will now be described.

The means for controlling and operating valve 38 includes usual rocking lever arms 34 on the valve, which are pivoted at 46 to a link 47 extending alongside the cylinder 20. The lower end of the link is forked at 48 and connected to studs 49 which project from the skirt of piston 27 through diametrically opposite vertical slots 50 in the cylinder 20. A spring 51 is connected at its respective ends to link 47 and cylinder 20 so as to tend to depress the link and thereby position the valve 38 in its inoperative position as shown in Fig. 2, and this movement of the link lowers piston 27 in cylinder 20 until it is supported on spring 29 with the latter in normal expanded position with its collar 30 resting on guide sleeve 33.

The tension of spring 51 is preferably adjustable, as for example as shown at 52, and the spring may be guided and protected by channeling link 47 so as to partially surround the spring. A further adjustment for the device comprises a stop 53, preferably axially adjustable in plug 23 by a threaded connection 54, and adapted for abutment of lever arm 32 against its depending head for limiting depression of foot pedal 25 and the corresponding elevation of plunger 31. The ported plug 23 may be locked in rotatably adjusted position relative to cylinder 20 by set screws 55 extending through the cylinder wall and seating in an annular groove 56 in the plug, and the plug is so adjusted as to project the foot pedal 25 at any desired angle for positioning it convenient to the foot of the driver of the vehicle, preferably closely adjacent the usual accelerator so that without changing the position of the heel and by simply laterally swinging the foot it may readily engage either the foot pedal 25 or the accelerator. The foot pedal 25 is preferably provided with an arm 60 adapted for engagement with cylinder 20 to prevent accidental upward swing of the pedal beyond its normal inoperative position shown in Fig. 2.

In operation, the vehicle brakes may be applied in usual manner by depressing brake pedal 5, with a lost motion connection 65 in rod 4 preferably permitting operative swinging of lever 3 without moving piston 8 in cylinder 9, or the brakes may be applied by fluid pressure directed against piston 8 and regulated by depressing foot pedal 25. Normal inoperative position of the pressure control is shown in Fig. 2, the spring 51 having shifted link 47 so as to move valve 38 to position shutting off the fluid pressure and exhausting cylinders 9 and 20 to the atmosphere, and moving piston 27 to a position where it is supported on spring 29 which is in normal expanded position with its plunger 31 depressed so as to swing foot pedal 25 to its upper limit of movement.

Depression of pedal 25 elevates plunger 31 and until there is pressure resistance against piston 27 the spring 29 remains expanded and correspondingly elevates the piston which in turn shifts link 47 against the relatively weak tension of spring 51. The valve 38 is thus rotated to first close exhaust 16 and then open intake 13 for supplying fluid pressure to cylinder 20 and thence to cylinder 9 for actuating rod 4 and applying the brakes. By means of the adjustment 52, the spring 51 is tensioned to produce any desired slight resistance to this depression of pedal 25, so that the driver of the vehicle will be advised of the initial brake application by feeling this resistance.

As soon as intake 13 opens, the fluid pressure passing through cylinder 20 on its way to cylinder 9 will offer resistance to further elevation of piston 27 and will thus tend to compress spring 29 and correspondingly resist further elevation of plunger 31 by the depression of pedal 25. If this resistance, by the increase in which the driver judges the increasing force of the brake application, is overcome by increased pressure on the foot pedal so as to continue the elevation of plunger 31, and spring 29, the increased tensioning of the spring will at first maintain it expanded and will thus further elevate piston 27 so as to shift link 47 for further opening intake 13 and increasing the fluid pressure supplied to cylinders 9 and 20. This increase in pressure will correspondingly increase the force of the brake application and will also increase the resistance to elevation of the piston, and as soon as this increase in pressure against the piston is no longer overcome by a corresponding increase in the tensioning of spring 29 resulting from its continued elevation by depressing pedal 25, the fluid pressure against the piston will compress the spring and thereby depress the piston for oppositely shifting link 47 so as to reduce the opening of intake port 39 until the pressure in cylinders 9 and 20 is again balanced by the tension of the spring. If the foot pedal is held depressed at any predetermined point, the continued compression of spring 29 and the corresponding depression of piston 27 resulting from the increasing pressure built up in cylinders 9 and 20, will finally shift link 47 to a position completely closing intake 39 but not yet opening exhaust port 41, and the maximum pressure which has been obtained in the cylinder 20 will thus be maintained until pedal 25 is either released or is further depressed.

If sufficiently increased force is exerted against the foot pedal to further depress it, the corresponding further elevation of plunger 31 will increase the tension of spring 29 so as to overcome the pressure resistance against the piston and thereby again elevate the piston for reopening intake port 39, and when the tension of the spring is again overcome by the increase in pressure supplied to cylinder 20 and directed against the piston, the piston will again be depressed in accordance with compression of spring 29 and will thereby again gradually reduce the opening of intake port 39 and will finally completely close the port so as to again maintain a pressure corresponding to the new position to which pedal 25 has been depressed. If pedal 25 is released after being depressed to any predetermined point, the release of the tension against spring 29 permits complete retraction of the piston by the pressure against it, and link 47 is thus shifted to its limit of movement repositioning the parts as shown in Fig. 2 with the intake closed and port 41 open to exhaust 16 for relieving the pressure in cylinder 20 and again rendering the control device inoperative.

The pressure supplied through discharge 12 is thus regulated by the degree of depression of pedal 25, with the resistance to the force exerted against the pedal relatively denoting the fluid pressure which is being supplied; and with the pedal depressed to any predetermined point the pressure supply is automatically controlled so as to uniformly maintain a corresponding predetermined pressure. The maximum pressure which may be supplied is regulated by adjusting stop 53 so as to limit depression of the foot pedal to any predetermined maximum, and when the invention is employed in connection with brake operating mechanism, the stop may be so adjusted as to provide a maximum pressure supply which will not lock the brakes and cause the vehicle to skid.

The balancing of the pressure supply by the tensioning of spring 29 permits accurate automatic regulation of the pressure, and by feeling the resistance to depression of pedal 25 the operator is definitely advised as to the relative pressure supply. The energy exerted in depressing pedal 25 for increasing the pressure supply, is only that necessary to so increase the tension of spring 29 as to overcome the pressure against piston 27, and the leverage provided by the foot pedal permits such tensioning of the spring by a relatively slight force causing no appreciable physical exertion.

The invention thus provides extremely practical means for regulating and uniformly maintaining a pressure supply which may be employed in any fluid pressure operating mechanism, such as vehicle brake actuating means, with the pressure accurately regulated and maintained by movement of a control which may be shifted with little physical effort, but which is subject to some slight increasing resistance during movement thereof in order to relatively advise the operator as to the pressure which is being supplied.

I claim:

1. Pressure regulating means comprising a piston, a rotary valve adapted for oscillation to open or close the valve, the valve when open being adapted for pressure discharge to shift the piston in one direction, means for yieldably resisting said shifting of the piston, means for moving the yieldable means so as to oppositely shift the piston and adjust the tensioning of the yieldable means, and means for oscillating the valve for respectively closing and opening the valve by shifting the piston in said first mentioned direction and in said opposite direction.

2. Pressure regulating means comprising a piston, a three-way rotary valve having an intake, a discharge and an exhaust; means for oscillating the valve by movement of the piston, the valve being adapted for rotation in one direction initially closing the intake and subsequently opening the exhaust or opposite rotation opening the intake with the exhaust closed, said opening of the intake supplying pressure for shifting the piston in a direction tending to rotate the valve so as to close the intake, means for yieldably resisting said shifting of the piston, and means for moving the yieldable means so as to oppositely shift the piston and adjust the tensioning of the yieldable means, said opposite shifting of the piston tending to rotate the valve so as to open the intake.

3. Pressure regulating means comprising a rotary valve for supplying pressure, the valve being adapted for oscillation to open and close the same means tending to rotate and close the valve in accordance with increase in the pressure supply, yieldable means resisting said rotation and tending to oppositely rotate and open the valve, and means for shifting said yieldable means to adjust the tensioning thereof.

4. Pressure regulating means comprising a cylinder, a piston in the cylinder, a valve having an operating arm at the exterior of the cylinder, the valve being adapted for pressure discharge to shift the piston in one direction, means for yieldably resisting said shifting of the piston, means for moving the yieldable means so as to oppositely shift the piston and adjust the tensioning of the yieldable means, and a link at the exterior of the cylinder connecting the piston and the valve operating arm for respectively closing and opening the valve by shifting the piston in said first mentioned direction and in said opposite direction.

5. Pressure regulating means comprising a cylinder, a piston in the cylinder, a rotary valve having an arm at the exterior of the cylinder for oscillating the valve to open or close the valve, the valve when open being adapted for pressure discharge to shift the piston in one direction, means for yieldably resisting said shifting of the piston, means for moving the yieldable means so as to oppositely shift the piston and adjust the tensioning of the yieldable means, a link at the exterior of the cylinder connecting the piston and the valve operating arm so as to oscillate the valve respectively closing and opening the valve by shifting the piston in said first mentioned direction and in said opposite direction.

In testimony whereof he has affixed his signature.

HERBERT U. DURANT.